Oct. 5, 1971  J. H. VANRIET ET AL  3,609,824
COUPLING
Filed Feb. 20, 1969
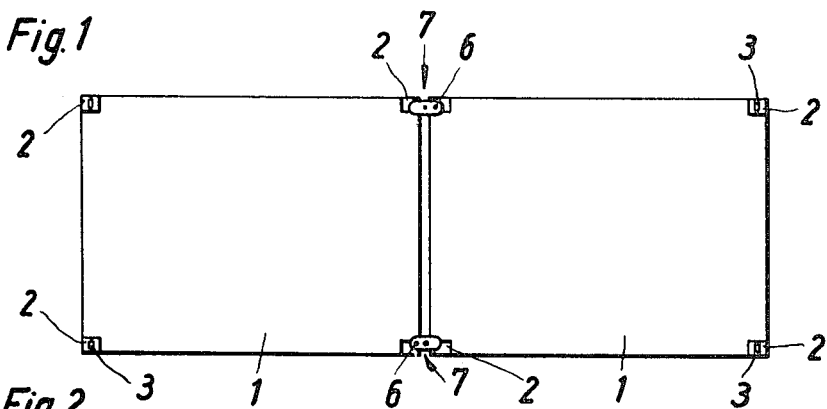
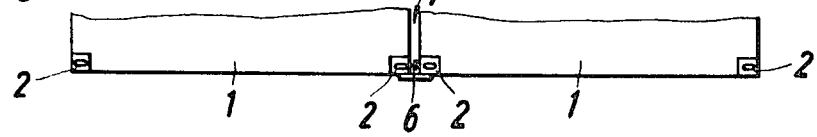
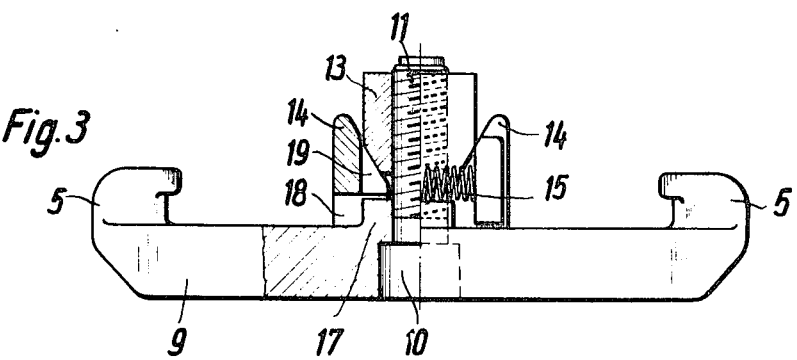
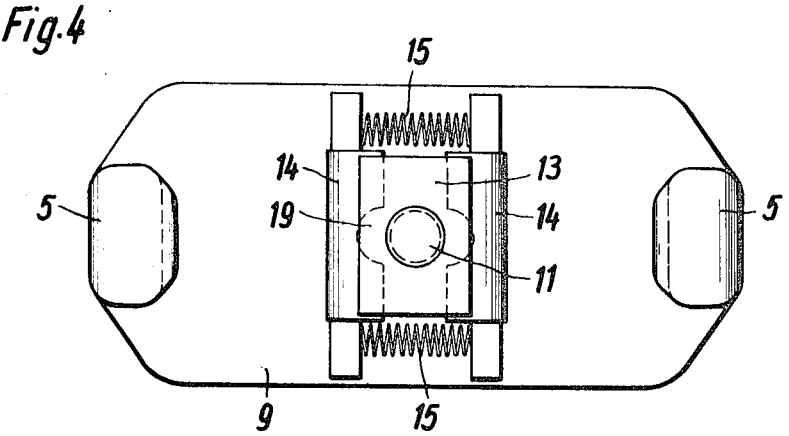
Inventors
Joseph H. van Riet
Walter Knott
by Michael J. Striker
Atty United States Patent Office 3,609,824
Patented Oct. 5, 1971

3,609,824
COUPLING
Joseph H. van Riet, Hamburg-Blankenese, and Walter Kriett, Hamburg, Germany, assignors to Blohm & Voss AG, Hamburg-Steinwerder, Germany
Filed Feb. 20, 1969, Ser. No. 801,024
Claims priority, application Germany, Mar. 30, 1968, B 75,230
Int. Cl. B65j 1/08; B66c 1/42
U.S. Cl. 24—81                                    9 Claims

ABSTRACT OF THE DISCLOSURE

A coupling for rigidly but releasably connecting containers which are provided in the region of their edge faces with engagement apertures. A coupling member has at least two hook-shaped projections each of which is receivable in an aperture of one of the containers. A pair of jaws is provided on the coupling member and extends into the gap between the containers so that, when the jaws are spread, the containers will be urged away from each other so that each container will be rigidly held between the jaws and that one of the projections which is received in an aperture of the respective container.

BACKGROUND OF THE INVENTION

The present invention relates to couplings, and more particularly to couplings for containers.

Containerization, that is the packing of goods and the like in containers at the point of shipment and the retention of such goods in the containers directly to the point of use, without necessitating intermediate packing and unpacking is becoming ever more prevalent in the handling of ocean freight, air freight and in other applications. With this shipping technique it is frequently necessary to connect two or more containers together because they are destined for the same recipient, or for other reasons. Evidently, if containers belonging together are coupled to one another they cannot be separated in transit and can also be handled more expeditiously. For this purpose couplings have been developed consisting of a pivotable hook which is mounted on a pin provided on one container and extending laterally therefrom, and which can be engaged with another pin provided on another container. The problem with this type of coupling is twofold, in that on the one hand it projects significantly beyond the actual container which makes handling of the thus-coupled containers more difficult, particularly in tight locations such as during insertion or removal through the loading hatches of a ship, an aircraft or the like; on the other hand this type of coupling does not provide for a truly rigid connection between the containers which is disadvantageous from the point of view of handling the same. Finally, this type of coupling of course requires a blocking arrangement for blocking undesired separation of the coupling and this makes the overall construction of the coupling rather complicated and expensive.

SUMMARY OF THE INVENTION

Taking into account what has been said before about the existing couplings of the type under discussion, it is a general object of the present invention to provide such a coupling which is not subject to the disadvantages of the prior art.

More particularly, it is an object of the present invention to provide such a coupling which projects from the connected containers only to a very insignificant extent and therefore does not adversely influence the maneuverability of the containers.

An additional object of the invention is to provide such a coupling which provides for a completely rigid connection between containers coupled therewith.

In pursuance of the above objects, and others which will become apparent hereafter, one feature of our invention resides in the provision of a coupling for rigidly but releasably connecting containers which are provided in the region of their edge faces with engagement apertures. This coupling comprises a coupling member having at least two hook-shaped projections which are respectively adapted to be each received in an aperture of one of two different containers, and means which prevents undesired withdrawal of the hook-shaped projections from the associated apertures. The coupling member itself has as its main body portion a flat plate-shaped section from which the hook-shaped projections extend. The desired rigid connection is effected by providing spreadable jaws which when the projections of the coupling member are received in apertures of two containers, extends into the gap between the two containers and, when the jaws are spread, pushes the containers away from each other so that each container is rigidly held between the projection cooperating with one of its apertures and one of the jaws.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 illustrates in a side view and in diagrammatic form two containers coupled with a coupling according to our invention;

FIG. 2 is a fragmentary plan view of FIG. 1;

FIG. 3 is a partly sectioned side elevation, on an enlarged scale, of a coupling according to the present invention; and FIG. 4 is a top plan view of FIG. 3.

DESCRIPTION OF THE PREFERRED EMBODIMENTS

Discussing now the drawing in detail it will be seen that we have illustrated in FIGS. 1 and 2 two containers 1 which are provided in their frame members 2 with apertures 3 facing laterally of the respective container 1. The containers 1 are connected at the location 7 by means of couplings 6 according to the present invention.

Such a coupling 6 is shown in the exemplary embodiment of FIGS. 3 and 4 in detail. It will be seen that it comprises a main body portion which is flat and plate-shaped and which is identified with reference numeral 9. At opposite ends of the body portion 9 are provided two hook-shaped projections 5 extending substantially normal to one of the major surfaces of the body portion 9. Each of these projections 5 is receivable in an aperture 3 of one of the two containers 1.

Intermediate the projections 5 the main body portion 9 is provided with a bore through which a screw 11 extends; to prevent the head 10 of the screw 11 from projecting outwardly beyond the body portion 9 the latter is provided with a recess which is illustrated but not separately identified with a reference numeral in which the head 10 of the screw is located in depressed condition. On the side opposite this recess the screw projects outwardly beyond the body portion 9 and carries a wedge member 13 which, as illustrated most clearly in FIG. 3, cooperates with two movable jaws 14. The jaws 14 each have connected thereto an end of one or more restoring springs 15 and are biassed inwardly by these springs 15 against the wedge faces of the wedge member 13. This is the closed condition of the jaws. Rotation-preventing means, here illustrated as a polygonal projection 17, is provided on the body portion 9 and extends into recesses 18 of the jaws 14 to thereby prevent turning of the jaws 14 and of the wedge member 13 when the screw 11 is turned. Each of the jaws 14 is further provided with a cutout 19 of substantially semicircular configuration to permit the jaws 14 to abut against the shaft of the screw 11 when they are in fully closed condition.

When each of the projections 5 is received in an aperture 3 of one of the containers 1, there is a gap between the juxtaposed end faces of the containers and the screw 11 with the wedge member 13 and the jaws 14 extends into this gap. Of course, there will usually be four of these couplings provided for securing any two containers together, one coupling at each corner. On turning the screw 11 in a sense causing the wedge member 13 to outwardly deflect the jaws 14 from closed to open position, the jaws 14 respectively engage and push against one of the containers so that each container becomes rigidly held between one of the jaws 14 and that one of the projections 5 which is associated with it, or rather with one of its apertures 3. When all four couplings associated with the two containers are used in this manner, the containers will be completely rigidly connected with one another.

The thickness of the coupling 6 can be very small, as illustrated, because the various components may be made of material which is extremely resistant to deformation and breakage so as not to require any significant thickness. Because of this the coupling according to our invention does not to any significant extent project beyond the general plane of the side faces of the containers, which is advantageous for the reasons which have been more fully developed in the beginning of this specification. By appropriately dimensioning the couplings 6 it is possible to assure that where smaller containers are so connected, their combined length together with that of the coupling will always correspond to the standard container size so that for instance two thus-coupled smaller containers can be treated in the same manner one standard container would be handled. By utilizing our novel coupling, wherein the absence of significant projection of the coupling beyond the general plane of the lateral faces of the containers is guaranteed, handling of the containers during movement into and out of loading hatches, during storage in storage areas, and during transportation on land vehicles where the overall dimensions of containers must not exceed the permissible maximum overall dimensions of the vehicle, is guaranteed so that the containers which are coupled in this manner may remain coupled under all circumstances until they have reached their point of ultimate destination.

It will be understood that each of the elements described above, or two or more together, may also find a useful application in other types of construction differing from the types described above.

While the invention has been illustrated and described as embodied in a coupling particularly suitable for connecting containers for containerized shipments, it is not intended to be limited to the details shown, since various modifications and structural changes may be made without departing in any way from the spirit of the present invention.

We claim:

1. A coupling arrangement, comprising at least two containers having respective juxtaposable side faces and edge faces which are inclined relative to the respective side face; engagement apertures provided in said edge faces in the region of said side faces; and at least one coupling for releasably but rigidly coupling said containers to one another, said coupling comprising a plate-shaped portion, at least two hook-shaped projections extending from said plate-shaped portion spaced from one another and each received in one of said engagement apertures, a pair of movable jaws on said plate-shaped portion intermediate said projections and located between said side faces, and wedge means for urging said jaws apart to thereby clampingly retain each container between one of said jaws and an associated one of said projections.

2. A coupling arrangement as defined in claim 1, wherein said portion is elongated, and wherein said projections are provided at opposite ends thereof.

3. A coupling arrangement as defined in claim 2, said projections being spaced from one another to such an extent as to leave a gap between the juxtaposed ends of the connected containers when said projections are received in the respective apertures; and wherein said means comprises an assembly rigid with said portion and arranged intermediate said projections so as to extend into said gap and engage the respective containers, said wedge means being operative for exerting pressure on said containers in a sense tending to move them away from one another whereby each container is rigidly clamped between said assembly and that one of said projections which is associated with the respective container.

4. A coupling arrangement as defined in claim 3, said wedge means including a screw and a wedge member located between said jaws and operatively associated with said screw so as to urge said jaws apart in response to rotation of said screw in a predetermined direction.

5. A coupling arrangement as defined in claim 3; and further comprising blocking means blocking turning movement of said wedge member and said jaws when said screw is rotated to effect movement of said jaws.

6. A coupling arrangement as defined in claim 1, said portion being provided with two major surfaces, and said projections projecting at least substantially normal to one of said major surfaces.

7. A coupling arrangement as defined in claim 1; and further comprising biasing means permanently biasing said jaws towards one another.

8. A coupling for rigidly but releasably connecting containers which are provided in the region of their edge faces with engagement apertures, comprising a coupling member having at least two spaced-apart hook-shaped projections which are each adapted to be received in an aperture of one of two different containers with a gap remaining between the latter; a pair of jaws intermediate said projections so as to extend into said gap and being movable apart from a normal rest position to an open position in which a respective one of said containers is clamped between one of said jaws and one of said projections; spreading means for spreading said jaws to said clamping position; and biasing means permanently urging said jaws to said rest position.

9. A coupling as defined in claim 8, said biasing means including helical restoring springs having opposite ends connected to the respective jaws.

References Cited

UNITED STATES PATENTS

| | | | |
|---|---|---|---|
| 620,495 | 2/1899 | Ramseaur | 24—81 CC |
| 3,449,801 | 6/1969 | Lafont et al. | 220—1.5 X |

DONALD A. GRIFFIN, Primary Examiner

U.S. Cl. X.R.

220—1.5